(12) United States Patent
Zapf et al.

(10) Patent No.: US 12,220,758 B2
(45) Date of Patent: Feb. 11, 2025

(54) METHOD FOR PRE-TREATING STAINLESS STEEL SUBSTRATES BEFORE SOLDERING USING NANOCRYSTALLINE SOLDER FOILS

(71) Applicant: Vacuumschmelze GmbH & Co. KG, Hanau (DE)

(72) Inventors: Lothar Zapf, Alzenau (DE); Natalia Ankuda, Büdingen (DE); Manfred Reuther, Büdingen (DE)

(73) Assignee: Vacuumschmelze GmbH & Co. KG, Hanau (DE)

( * ) Notice: Subject to any disclaimer, the term of this patent is extended or adjusted under 35 U.S.C. 154(b) by 0 days.

(21) Appl. No.: 17/844,203

(22) Filed: Jun. 20, 2022

(65) Prior Publication Data
US 2022/0314353 A1     Oct. 6, 2022

Related U.S. Application Data

(62) Division of application No. 16/779,347, filed on Jan. 31, 2020, now Pat. No. 11,383,315.

(30) Foreign Application Priority Data

Feb. 1, 2019 (DE) .......................... 102019102544.3

(51) Int. Cl.
     *B32B 15/01*     (2006.01)
     *B23K 1/20*     (2006.01)
     (Continued)

(52) U.S. Cl.
     CPC .............. *B23K 1/20* (2013.01); *B32B 15/015* (2013.01); *C25D 3/12* (2013.01); *C25D 3/30* (2013.01);
     (Continued)

(58) Field of Classification Search
None
See application file for complete search history.

(56) References Cited

U.S. PATENT DOCUMENTS 3,616,292 A    10/1971   Wilson
3,715,231 A    2/1973   Ng et al.
(Continued)

FOREIGN PATENT DOCUMENTS

CN    104862749 A    8/2015
DE    102006035765 A1    1/2008
(Continued)

OTHER PUBLICATIONS

English machine translation of EP 0080971, EPO, accessed Sep. 6, 2023.*

(Continued)

*Primary Examiner* — Xiaobei Wang
(74) *Attorney, Agent, or Firm* — Dickinson Wright PLLC

(57) ABSTRACT

A soldered product comprising a first component soldered to a second component is provided. The first component comprises a stainless steel substrate, an adhesion promoter layer made of nickel deposited on at least one joining surface of the stainless steel substrate; and a tin layer deposited on the adhesion promoter layer. The tin layer has a layer thickness in the range of 10-30 μm. The second component is typically a rare earth magnet.

6 Claims, 2 Drawing Sheets

(51) Int. Cl.
  *B23K 101/34* (2006.01)
  *B23K 103/04* (2006.01)
  *C25D 3/12* (2006.01)
  *C25D 3/30* (2006.01)
  *C25D 5/12* (2006.01)

(52) U.S. Cl.
  CPC ............ *C25D 5/12* (2013.01); *B23K 2101/35* (2018.08); *B23K 2103/05* (2018.08); *Y10T 428/12722* (2015.01); *Y10T 428/12937* (2015.01)

(56) References Cited

U.S. PATENT DOCUMENTS

| | | | |
|---|---|---|---|
| 4,643,347 A * | 2/1987 | Bronnes | B23K 1/20 228/208 |
| 6,773,828 B1 | 8/2004 | Ooi et al. | |
| 9,834,848 B2 | 12/2017 | Nishida et al. | |
| 2004/0247978 A1 | 12/2004 | Shimamune | |
| 2011/0037549 A1* | 2/2011 | Miyao | C22C 9/00 335/302 |
| 2012/0134034 A1* | 5/2012 | Niwa | H02K 41/0356 228/159 |
| 2013/0029170 A1 | 1/2013 | John et al. | |
| 2013/0071738 A1* | 3/2013 | Wang | C25D 7/00 219/121.64 |
| 2017/0017056 A1* | 1/2017 | Park | G02B 7/08 |
| 2017/0159197 A1 | 6/2017 | Nishida et al. | |

FOREIGN PATENT DOCUMENTS

| | | |
|---|---|---|
| EP | 0080971 A1 | 6/1983 |
| EP | 1260614 A1 | 11/2002 |
| EP | 1631450 B1 | 11/2007 |
| EP | 2557617 A1 | 2/2013 |
| GB | 584934 A | 1/1947 |
| GB | 2581024 A | 8/2020 |
| JP | 61117291 A | 6/1986 |
| JP | 2003153477 A * | 5/2003 |
| JP | 2005144895 A | 6/2005 |

OTHER PUBLICATIONS

UniMetal Surface Finishing, "Tin Plating", Jan. 2016, <https://www.unimetal.com/services-finishes/tin-plating/>, accessed via web.archive.org at https://web.archive.org/web/20160120031104/https://www.unimetal.com/services-finishes/tin-plating/ (Year: 2016).*
British Combined Search and Examination Report mailed Jul. 1, 2020 for British Application No. 2001427.0, 2 pages.
Supplemental British Search Report mailed Oct. 5, 2020 for British Application No. 2001427.0, 1 page.
British Combined Search and Examination Report mailed Feb. 8, 2021 for British Application No. 2100411.4, 2 pages.
Mills, "Abrasive Blasting with Post-Process and In-Situ Characterization," PhD dissertation, Virginia Tech, 2014, 11 pages.
Zatkalíková et al., "Pitting Corrosion Of Stainless Steel At The Various Surface Treatment," Materials Engineering, Sep. 2011, vol. 18, No. 4, 6 pages.

* cited by examiner

METHOD FOR PRE-TREATING STAINLESS STEEL SUBSTRATES BEFORE SOLDERING USING NANOCRYSTALLINE SOLDER FOILS

CROSS-REFERENCE TO RELATED APPLICATIONS

This U.S. divisional patent application claims the benefit of U.S. patent application Ser. No. 16/779,347, filed Jan. 31, 2020, which claims the benefit of German Patent Application No. DE 10 2019 102 544.3, filed 1 Feb. 2019, the entire contents of which are incorporated herein by reference for all purposes.

TECHNICAL AREA

The present description relates to the field of joining technology, in particular a method for pretreating stainless steel substrates before soldering.

BACKGROUND

Soldering is a thermal process for material joining (joining), in which a liquid phase is formed by melting a solder or by diffusion at the interfaces of the parts to be joined. Although the liquidus temperature of the parts to be joined is not reached during soldering, in many soldering processes the parts to be joined are strongly heated. For this reason, many soldering methods are not suitable for the joining of permanent magnetic components that they would be completely or partially demagnetized during the soldering due to the associated heating.

As part of his doctoral thesis at the Helmholtz Center Berlin and the Technical University of Berlin, Carsten Kuhn developed a soldering process for joining rare earth magnets using reactive nanofilms (e.g. so-called NanoFoil®, sold by Indium Corp., Utica, NY). The work was carried out in the Undulators department under the guidance of Johannes Bahrdt. The process is described in the dissertation "Development of manufacturing processes for a cryogenic undulator and its validation by magnetic measurements on a prototype" (Technical University Berlin, Feb. 11, 2016) and the publication J. Bahrdt, C. Kuhn, "Cryogenic Permanent Magnet Undulator Development at HZB/BESSY II", Synchrotron Radiation News, Vol. 28, No. 3 (2015) 9-14. Due to the very rapid heating of the nanofoil, very little heat is introduced into the components to be joined. The method enables magnets to be joined without the risk of partial demagnetization. The smaller the magnet dimensions, the more important this is. The soldered magnets were successfully used in an undulator with a period length of only 9 mm.

In order to obtain a reliable solder connection, it is important that the surfaces to be joined are well wettable in order to be able to form a material connection with the solder. Rare earth alloys used for permanent magnets (such as neodymium-iron-boron, praseodymium-iron-boron or samarium-cobalt) are generally difficult to wet, and consequently the surfaces to be joined must be coated before soldering, using as the material for the coating, for example Tin or gold are possible. The same applies to the surface of substrates made of soft magnetic material (e.g. cobalt iron) or stainless steel substrates.

With the soldering method known from the above-mentioned dissertation, permanent magnetic components can be soldered to one another or also to soft magnetic substrates. However, tests have shown that when soldering on stainless steel substrates, the production of the necessary tin plating is a problem, since tin coatings produced in a conventional manner do not adhere easily to stainless steel surfaces, so that a soldered connection with sufficient strength could not be produced.

The inventors have set themselves the task of developing a tinned stainless steel substrate with a well-adhering tin coating and a method for producing such a stainless steel substrate.

SUMMARY

The above object is achieved by a substrate, as described herein, a method for producing such a substrate, as described herein, and by a soldering method, as described herein. A method for coating a stainless steel substrate is described below. According to one exemplary embodiment, the method comprises sandblasting at least one joining surface of a stainless steel substrate and treating the joining surface of the stainless steel substrate with an aqueous solution (acid bath) which contains sulfuric acid, nitric acid and hydrofluoric acid. The stainless steel substrate is then rinsed with hydrochloric acid. The method further includes galvanic deposition of a nickel coating on the joining surface of the stainless steel substrate and the subsequent deposition of a tin layer on the nickel-coated joining surface of the stainless steel substrate.

BRIEF DESCRIPTION OF THE DRAWINGS

In the following, exemplary embodiments are explained in more detail with the aid of figures. The representations are not necessarily to scale and the exemplary embodiments are not limited to the illustrated aspects. Rather, it is important to present the principles on which the exemplary embodiments are based. The illustrations show.

DETAILED DESCRIPTION

Figure 1:
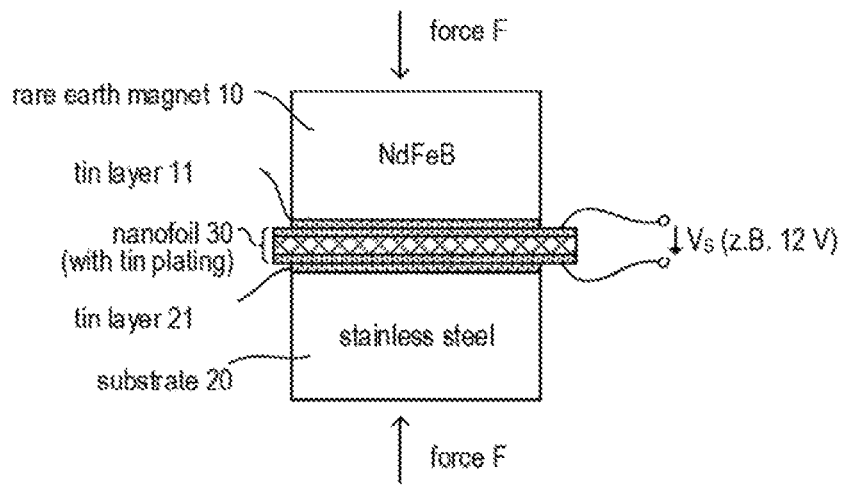
FIG. 1 schematically illustrates a soldering process using nanofoil.

FIG. 1 schematically illustrates a soldering process for joining a rare earth magnet 10 with a substrate 20, which is made of stainless steel in the examples described here. In the same way, two rare earth magnets or one rare earth magnet can be soldered to a soft magnetic substrate (e.g. cobalt iron). The substrate materials play a subordinate role in the soldering process, but the substrate usually has to be tinned. That is, in the present example, the surfaces to be joined of the rare earth magnet 10 and the substrate 20 are tinned (tin coatings 11 and 21). A tinned nanofoil 30 is arranged between the components 10 and 20. As already mentioned at the beginning, the production of a well-adhering tin layer on a stainless steel substrate using conventional methods is problematic. However, before the pretreatment of the stainless steel substrate 20 for producing the tin coating 21 is discussed in more detail, the soldering process using nanofoil will first be explained.

The nanofoil is a multilayer system which, for example, has a multiplicity of alternately arranged aluminum and nickel layers. Multi-layer systems made of other material combinations are also possible, e.g. Aluminum/titanium or nickel/silicon. A nanofoil can contain several thousand alternating layers of e.g. Have aluminum and nickel, wherein the individual layers can have thicknesses in the range from 25 nm to 90 nm. The nanofoil as a whole can have a thickness in the range of 10-100 μm. If the layers are sufficiently thin and the reaction products of the layers have a negative enthalpy of binding (e.g. with −59.2 kJ per mole for aluminum/titanium), such multilayer systems can use a relatively low energy input (e.g. by applying an electrical voltage VS, see FIG. 1) a self-propagating exothermic reaction is triggered, whereby the nanofoil is heated and a diffusion process is started, by which the solder connection is formed. The solder becomes at least partially liquid when the solidus temperature is exceeded, as a result of which a material connection is produced due to diffusion processes between the solder and the surfaces of the parts to be joined.

During the soldering process, pressure (see FIG. 1, force F) is exerted on the joining zone via a device (not shown in FIG. 1). The pressure (joining pressure) during soldering can e.g. are in the range of 0.1 and 0.3 MPa. The amount of heat released during soldering depends on the area of the joint and the thickness of the reactive foil. The achievable energy density is approx. 1000-1250 J/g and (locally in the joining zone) temperatures in the range of 130-1500 degrees Celsius can arise. The heat is generated directly in the joining zone, the amount of heat remaining small enough that the components 10 and 20 are not significantly heated. In this way, a thermal influence on the magnetic (or other) properties (in particular a reduction in the remanent magnetization) of a magnetic component can be avoided. As already mentioned at the beginning, suitable nanofilms are e.g. from Indium Corp., Utica, NY, under the name NanoFoil®. The associated joining process is called NanoBond®. Fluxes, which are necessary for other soldering processes, are not required.

For a sufficiently strong solder joint, the adhesion of the tin layers 11 and 21 on the underlying surfaces of the rare earth magnet 10 and the substrate 20 is of crucial importance. As already mentioned, it is not so easy with conventional methods to produce a sufficiently firmly adhering tin coating on a stainless steel surface. The exemplary embodiments described below relate to a method for pretreating the substrate 20 (in particular a substrate made of stainless steel), a tin layer being deposited on the substrate 20 and adhering firmly to the substrate. Stainless steel is understood here as a stainless steel (see DIN EN 10088-2). In the exemplary embodiments described here, for example, a stainless austenitic steel, in particular a chromium-nickel-molybdenum steel, can be used as the stainless steel. Steel with the material designation X2CrNiMoN17-13-3 (material number 1.4429 according to DIN EN 10027-2) was used in the experiments carried out. However, other stainless steels can also be used.

Figure 2:
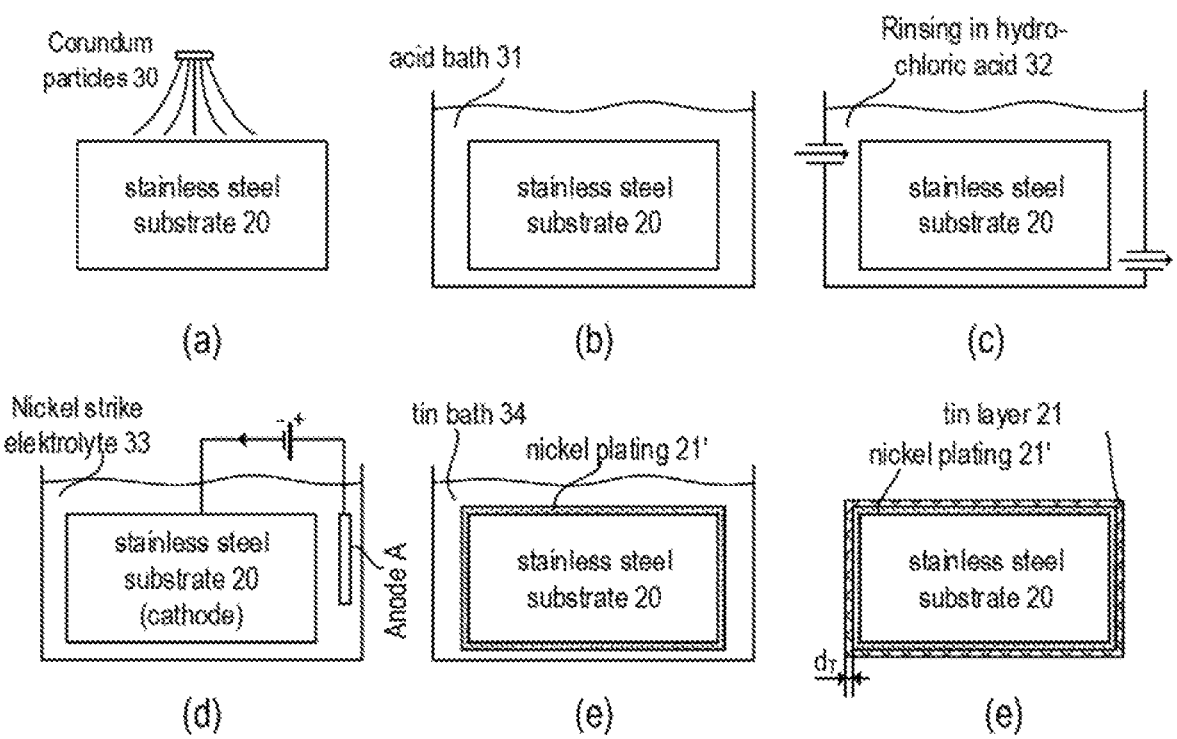
FIG. 2 illustrates an example of a method for coating a stainless steel substrate.

Various methods are described in the literature for the adhesive galvanic coating of stainless steel surfaces, e.g. Pickling in a hot (approx. 70° Celsius) sulfuric acid solution with 20% to 50% (mass percent) sulfuric acid, cathodic treatment in sulfuric acid or hydrochloric acid, activation in an iron or nickel attack bath (also called nickel strike) with subsequent electroplating. All of these methods, in conjunction with galvanic tinning, lead to firm, adhesive layers, but the layer composite dissolves during the subsequent soldering with nanofoil and the tin layer loses its adhesion to the stainless steel substrate. With the exemplary embodiments described here, stainless steel substrates with firmly adhering galvanic tinning can be produced, the strength of which is also given after the soldering process with nanofilm. Experiments have shown that the magnet-stainless steel system has a strength of more than 15 N/mm2. The magnetic-stainless steel composite components were tested in a shear test to determine the strength FIG. 2 schematically illustrates the different process steps. Accordingly, the surface of the stainless steel substrate 20 to be coated (and possibly cleaned) is first sandblasted (see diagram (a) from FIG. 2). For sandblasting, for example, corundum particles (blasting corundum) at a blasting pressure of 1-10 bar (100-1000 kPa), e.g. 8 bar can be used. The surface can then (optionally) be blown off with oil-free compressed air. The blasting corundum can have a mixed grain size with particle sizes between 250 and 500 μm. Various suitable sandblasting techniques are known. The most common method is also known as compressed air jets. Other techniques include blast wheel blasting, in which the particles are accelerated by a paddle wheel, and vacuum suction blasting.

In a next step, the substrate 20 is immersed in an acid bath 31 for a period of, for example, 2-3 minutes (see diagram (b) from FIG. 2). The acid bath 31 can be formed by an aqueous solution with 1-20% sulfuric acid, 1-20% nitric acid and 1-15% hydrogen fluoride (hydrofluoric acid). The rest at 100% is water. The percentages are percentages by mass. In a specific embodiment, the acid bath contains 50 g of concentrated sulfuric acid, 100 g of nitric acid (53% solution) and 75 g of hydrofluoric acid (40% solution, corresponds to 30 g of hydrogen fluoride) per liter of demineralized water. The duration of treatment can be about 2-3 minutes. According to the exemplary embodiments described here, the acid bath 31 can be tempered. For example, the acid bath 31 has a temperature between 40 and 95 degrees Celsius, in particular around 70 degrees Celsius.

The acid bath 31 removes oxides which form a passivation layer on the surface of the substrate 20 and thus activates the surface (surface activation). Stainless steel generally forms a passivation layer made of chromium oxide on the surface, which is removed in the acid bath 31. The relevant surfaces of the substrate 20 are then rinsed in dilute hydrochloric acid 32 (see diagram (c) from FIG. 2). In one embodiment, the substrate is rinsed twice in hydrochloric acid for 20 to 60 seconds each (e.g. 30 seconds). The hydrochloric acid 32 can have a concentration of at least 5%. In some embodiments, the concentration is in the range of 8-12% (mass percent). The steps described above can improve the adhesion of the subsequently deposited coatings.

Without intermediate rinsing with water and without prior drying (i.e. "wet in wet"), the substrate 20 is then coated using a so-called nickel strike process. In experiments, e.g. uses a nickel strike bath 33 which contains a solution of demineralized water (also known as fully demineralized water or demineralized water), nickel (II) chloride (e.g. in the form of nickel (II) chloride hexahydrate, NiCl2·6 H2O) and hydrochloric acid (36 percent by mass). For every 1000 ml of water 240 g nickel (II) chloride hexahydrate and 125 g 36% hydrochloric acid. The galvanization in the nickel strike bath 33 can e.g. at a current density of 2-10 amperes per dm2 for approx. 2 minutes (first stage). The current density can then be reduced to approx. 1-2 amperes per dm2 for a further 2 minutes (second stage). The current densities and the duration of treatment can e.g. depending on the specific composition of the nickel strike electrolyte 33 may also be different. The nickel strike method outlined in diagram (d) from FIG. 2 is known per se and suitable nickel strike electrolytes are commercially available and are described in the relevant specialist literature. The nickel-plated substrate 20 can then be rinsed with demineralized water (for about 30 seconds, not shown in FIG. 2). The nickel coating 21' produced on the substrate serves as an adhesion promoter layer for the subsequent tin coating. Even if the entire surface of the stainless steel substrate 20 is coated in the example from FIG. 2, it may be sufficient to coat only the joining surface of the stainless steel substrate 20, i.e. the surface that will be soldered on later. The layer thickness of the nickel coating 21' is comparatively thin, e.g. smaller than 1 μm. In the exemplary embodiments described here, the thickness of the nickel coating 21' is clearly below 500 nm.

Without prior drying (wet in wet), the substrate 20 is then placed in a tin bath 34 (tin electrolyte) and tin-plated. For this purpose, the substrate 20 (with a nickel coating 31') can be immersed in the tin bath without current for about 10-120 seconds. A strongly acidic electrolyte is used as the tin electrolyte (e.g. with a pH value of less than 1). Other methods are usually less suitable. For example, a bright tin bath which is commercially available, for example, from Dr.-Ing. Max Schlötter GmbH & Co. KG, Geislingen, Germany, is available under the name SLOTOTIN 30-1. In some embodiments, the dive time is 20-40 seconds (de-energized). The galvanic coating then takes place at currents of approximately 0.5-1.5 amperes per dm2 (for example 1-1.3 A/dm2) until a layer thickness dT of approximately 10-30 μm has been achieved. In some exemplary embodiments, the layer thickness dT is in the range of 12-15 μm. The tin coating 21 adheres with sufficient strength even after the subsequent soldering process. Since, as mentioned, the thickness of the nickel coating 21' is usually significantly smaller than 1 μm, the total thickness of the layers 21' and 21 is essentially determined by the layer thickness dT of the tin coating 21.

Figure 3:
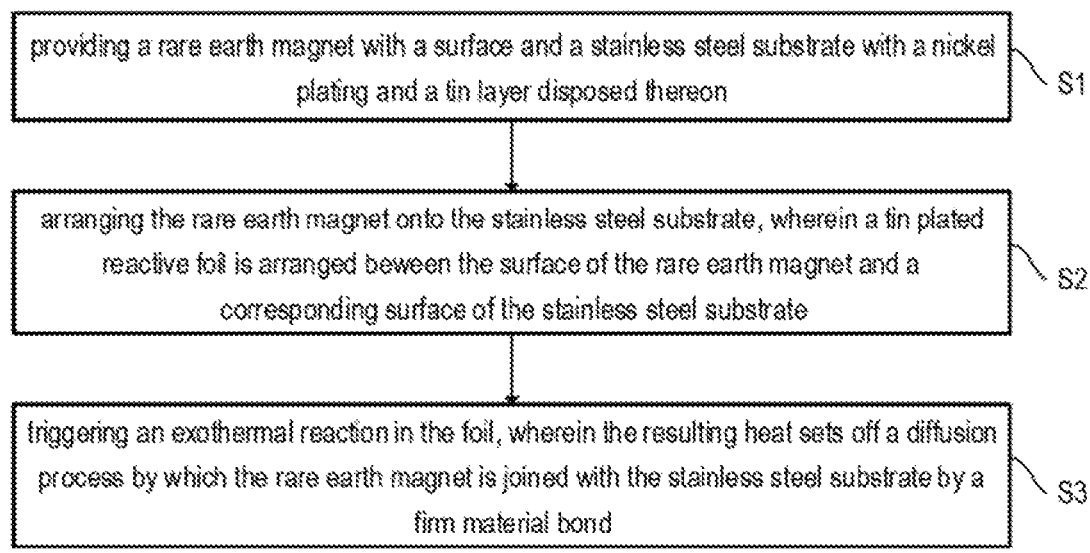
FIG. 3 is a flow chart to illustrate the joining process by means of soldering.

FIG. 3 is a flowchart illustrating the joining process for connecting a rare earth magnet to a stainless steel substrate by means of soldering, which has previously been tinned as described above. In the first step S1, a tin-plated rare earth magnet (for example a neodymium-iron-boron magnet with galvanically produced tin-plating with a thickness of approximately 15 μm) is provided. In a second step S2, the rare earth magnet is arranged on the substrate, the substrate being a stainless steel substrate coated according to the method described above (see FIG. 2). A tinned, reactive foil is arranged between the joining surface of the rare earth magnet and a corresponding joining surface of the stainless steel substrate 20, for example the NanoFoil® mentioned above. The third step S3 relates to the actual soldering process. An exothermic reaction is triggered in the reactive film (e.g. by applying an electrical voltage). The resulting heat sets in motion a diffusion process by which the rare earth magnet is firmly bonded to the tinned stainless steel substrate.

With the help of the method described above (see FIG. 2) for pretreating the stainless steel substrate 20 it is achieved that the tin coating adheres sufficiently firmly to the stainless steel surface even after the soldering process. As mentioned, strengths of more than 15 N/mm2 could be achieved in the shear test. With the above-described soldering process using reactive nanofoil, of course, not only rare earth magnets, but also other metallic components can be soldered onto a (appropriately pretreated) stainless steel substrate.

The sandblasting is crucial for the strength of the solder joint created later. Without sandblasting, an adhesion fracture between the stainless steel substrate 20 and the tin layer 21 was observed in the shear test on the soldered composite stainless steel-substrate-rare earth magnet with a shear stress of less than 1 MPa. However, the tin coating 21 itself (without subsequent soldering) is sufficiently strong even without sandblasting, which could be shown in an adhesive/shear test. The same applies to the hydrochloric acid rinse of the stainless steel substrate 20. In a control experiment, this hydrochloric acid rinse was replaced by a rinse with demineralized water, which also had the consequence that the strength of the composite was not sufficiently high in the shear test after soldering. In this case, too, an adhesion break between the stainless steel substrate 20 and the tin layer 21 could be observed. In the case of stainless steel substrates, which were pretreated according to the procedure described here before soldering, no adhesion break could be observed in the shear test on the soldered bond, but rather a cohesive break in the tin layer. The cohesive break occurred at a shear stress of more than 15 MPa.

The invention claimed is:

1. A soldered product comprising:
   a component comprising a stainless steel substrate, an adhesion promoter layer made of nickel coating at least one surface of the stainless steel substrate, and a first tin layer coating the adhesion promoter layer; and
   a rare earth magnet which is coated with a second tin layer and soldered to the coated stainless steel substrate, wherein the second tin layer is disposed directly on a surface of the rare earth magnet.

2. The soldered product of claim 1, wherein a layer thickness of the first tin layer is in the range of 10-30 μm.

3. A soldered product comprising:
   a component comprising a stainless steel substrate, an adhesion promoter layer made of nickel coating at least one surface of the stainless steel substrate, and a first tin layer coating the adhesion promoter layer; and
   a rare earth magnet which is coated with a second tin layer and soldered to the coated stainless steel substrate, wherein a solder joint between the rare earth magnet and the coated stainless steel substrate is obtained from a solder foil.

4. The soldered product of claim 3, wherein the solder foil is a multilayer system that is designed to initiate a diffusion process by an exothermic reaction, wherein the diffusion process initiated by the solder foil forms the solder joint between the rare earth magnet and the coated stainless steel substrate.

5. A soldered product comprising:
   a component comprising a stainless steel substrate, an adhesion promoter layer made of nickel coating at least one surface of the stainless steel substrate, and a first tin layer coating the adhesion promoter layer; and
   a rare earth magnet which is coated with a second tin layer and soldered to the coated stainless steel substrate, wherein a solder joint between the rare earth magnet and the coated stainless steel substrate, in a shear test, has a shear strength of more than 15 N/mm$^2$.

6. The soldered product of claim 5, wherein the solder joint between the rare earth magnet and the coated stainless steel substrate is obtained from a solder foil, the solder foil is a multilayer system that is designed to initiate a diffusion process by an exothermic reaction, and the diffusion process initiated by the solder foil forms the solder joint between the rare earth magnet and the coated stainless steel substrate.

* * * * *